July 7, 1964    L. C. ERICKSON    3,139,967
RECIPROCATING PLATE FEEDING DEVICE
Filed Feb. 23, 1961
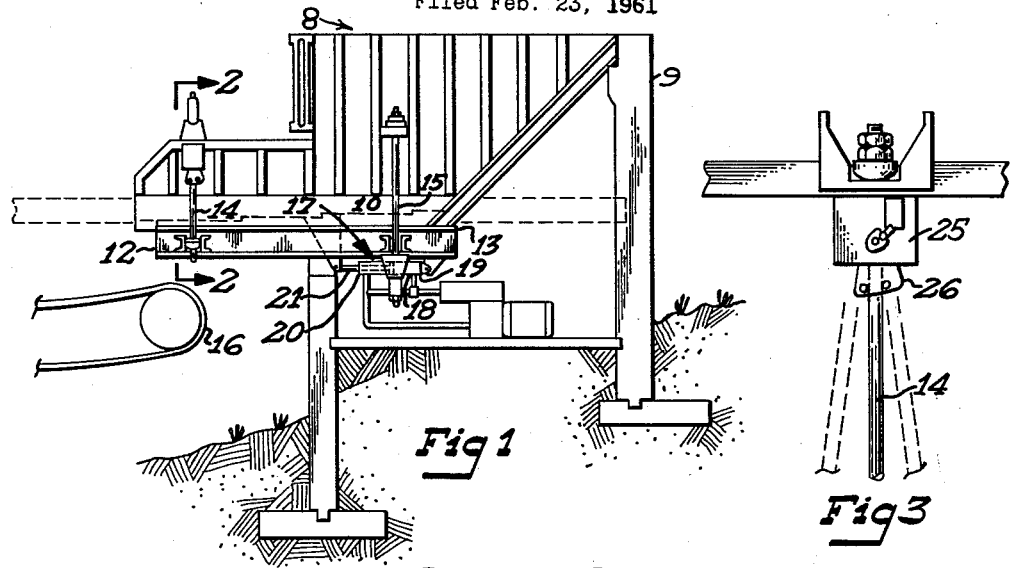
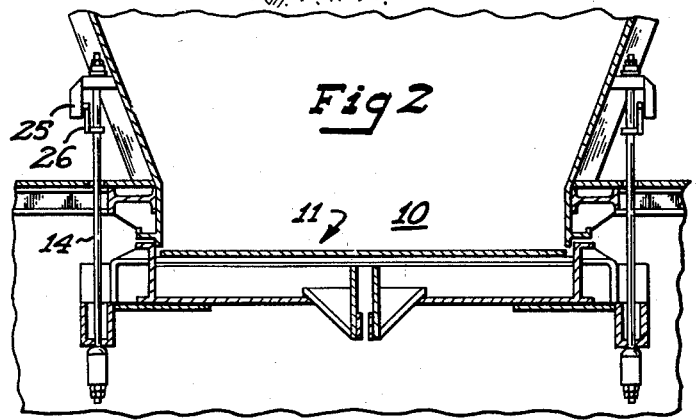
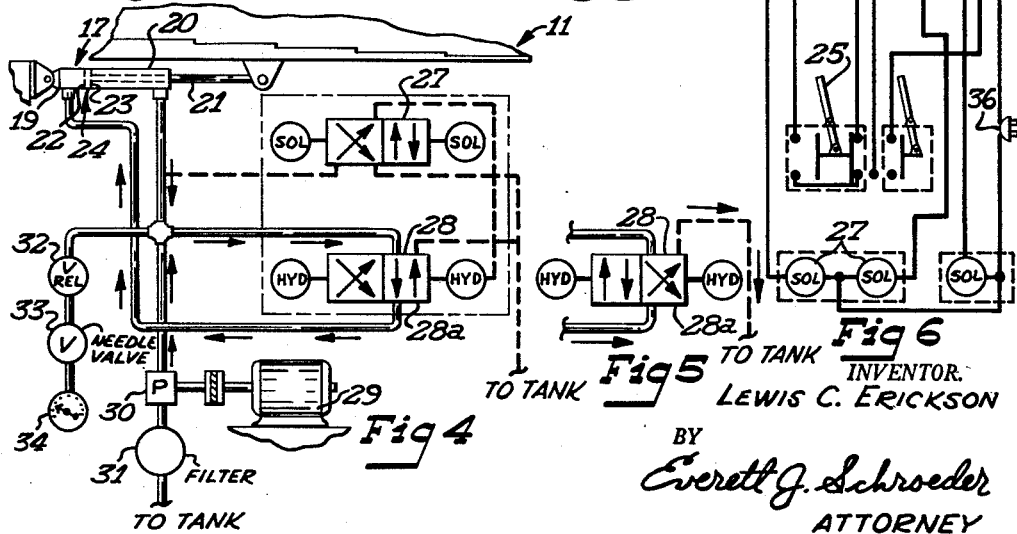
INVENTOR.
LEWIS C. ERICKSON
BY
Everett J. Schroeder
ATTORNEY

United States Patent Office 3,139,967
Patented July 7, 1964

3,139,967
RECIPROCATING PLATE FEEDING DEVICE
Lewis C. Erickson, Duluth, Minn., assignor to National Iron Company, Duluth, Minn., a corporation of Delaware
Filed Feb. 23, 1961, Ser. No. 125,284
3 Claims. (Cl. 198—60)

This invention relates to reciprocating plate feeders and drives therefor. More particularly it relates to a reciprocating feeding device which includes a reciprocating plate feeder constituting a feeding bottom for a hopper and reciprocated by means of a differential cylinder and piston assembly to provide a highly improved manner of feeding.

This application is a continuation in part of my copending application for U.S. Letters Patent Serial No. 724,567, entitled "Reciprocating Plate Feeder" filed by me on March 28, 1958, now Patent No. 3,097,734 issued July 16, 1963, and is related to the two divisional applications thereof Serial No. 46,805 filed August 1, 1960 entitled "Support for Non-Vertically Moving Plate Feeder," now abandoned, and Serial No. 46,725 filed August 1, 1960 and entitled "Heavy Burden Plate Feeder Suspension," now Patent No. 3,097,738 issued July 16, 1963.

In the iron mining industry particularly, as well as in other industries, there is definite need for a continuous positive displacement, uniform-rate feeder for transferring heavy materials from a hopper, for example, to a continuous conveyor. Reciprocating feeders, because of their simplicity of construction and durability, are well suited for this task provided a satisfactory drive and rate of feed can be furnished. Various types of drive have heretofore been devised but none of them, to my knowledge, have proved satisfactory from a standpoint of durability, maintenance, and performance. Vibratory feeders have been utilized, for example, but such feeders contemplate an upward throwing of the material and the depth of the bed of material handled is slight as compared to the width of the feeder so that it had very definite capacity limitations and cannot handle large pieces (which in iron ore may weigh several hundreds of pounds). Vibratory feeders do not use positive displacement and cannot support much weight. If they are overloaded, the vibrator coil fails. Vibratory feeders fail to function satisfactorily in handling sticky materials and tend to create bridging because the nature of its action tends to solidify the material. In addition, a vibratory feeder cannot be placed directly beneath the hopper because they are not strong enough to function as a bottom for a hopper.

I have found that a mechanical reciprocating feeder also leaves much to be desired for such feeders have mechanical deficiences in that they provide full or maximum horse power only at the center of their stroke. Such mechanical feeders have an uncontrolled stroke at either end and have excessive power requirements.

I have found that by utilizing a differential cylinder and piston assembly as a drive and arranged with its rod end attached to a plate feeder deck and the head end attached to the hopper frame below the hopper discharge, the disadvantages of the vibratory feeders and the mechanically driven plate feeders can be overcome and a number of additional very important advantages can be obtained. Through the use of a differential fluid circuit and cylinder assembly, I apply pressure at each side of the piston at all times and hence have a controlled stroke at all times. By connecting the rod end of the piston to the reciprocatory plate deck feeder and the head end to the hopper supporting frame beneath the hopper discharge, the forward stroke of my feeder is much faster than the rearward stroke because in my differential circuit the fluid which is forced out ahead of the piston is forced back into the head end of the cylinder and thus the forward speed of the cylinder is increased at a loss in power. Thus I have maximum speed when it is most needed for in the reciprocatory plate feeder the feeding operation is theoretically performed only during the rearward movement of the plate deck feeder. Thus I minimize the inaccuracies in the feed rate and make the latter more uniform. In addition, I have maximum power and minimum speed when I need it which is during the backstroke. I provide a desired slower back stroke in order to provide a more uniform feed since a reciprocating plate feeder feeds by positive displacement caused by the material descending from the hopper onto the rearward portion of the plate deck feeder and behind the material which has moved forwardly therewith along with the forward movement of the plate deck feeder. As the plate deck feeder is forced rearwardly at a slower speed, the material drops off the forward end of the feeder deck onto the conveyor below at a uniform rate. Since I use the same power supply and the fluid from the head end is directed back to the reservoir the speed of the return or rearward stroke is substantially less than that of the forward stroke and there is more power available. Both of these are ideal conditions for the backstroke.

It is a general object of my invention to provide a novel and improved feeding device of relatively simple and inexpensive construction and operation.

A more specific object is to provide a novel and improved feeding device of the reciprocatory plate deck feeder type of simple and inexpensive construction and operation and functioning in an improved manner in accordance with particularly desirable attributes of such a feeder.

Another object is to provide a novel and improved feeding device of simple and efficient construction and operation which will provide a more uniform positive displacement feed rate than has heretofore been known.

Another object is to provide a novel and improved feeding device which will provide a rapid forward stroke and a relatively slow return stroke, will not be as susceptible to wear, and will function more efficiently than similar devices heretofore known.

Another object is to provide a novel and improved feeding device which has a completely controlled drive at all times.

Another object is to provide a novel and improved feeding device having a plate deck feeder constituting a material feeding bottom for the material containing hopper and simultaneously providing an improved uniform rate of feed.

Another object is to provide a novel and improved feeding device having full and uniform power throughout all portions of its individual strokes and which is completely controlled at all times.

These and other objects and advantages of this invention will more fully appear from the following description, made in connection with the accompanying drawings, wherein like reference characters refer to the same or similar parts throughout the several views, and in which:

FIG. 1 is a side elevational view of one embodiment of my invention connected to a hopper and discharging upon a continuous conveyor.

FIG. 2 is a vertical sectional view taken along line 2—2 of FIG. 1 but on an enlarged scale.

FIG. 3 is a fragmentary detailed view on an enlarged scale of the reversing mechanism for the differential circuit.

FIG. 4 is a diagrammatic view of the hydraulic system utilized to drive the cylinder; and FIG. 5 is a diagrammatic view of the hydraulic valve when moved to its opposite position relative to that shown in FIG. 4; and FIG. 6 is a schematic wiring diagram showing the means by which the pilot valve is controlled by the reversing mechanism.

One embodiment of my invention as shown in FIGS. 1–6 includes a hopper 8 mounted upon a frame 9 and having a discharge opening 10 at its bottom. Extending across the discharge opening and constituting a reciprocating bottom for the hopper 8 is a reciprocating stepped feeder deck 11. This feeder deck, as shown, has a forward end 12 and a rearward end 13. The feeder deck 11 is supported on the frame of the hopper 8 at each side thereof by a pair of elongated support rods identified by the numerals 14 and 15. Each of these rods is provided with rockers at its upper and lower ends to support the weight of the reciprocating feeder deck 11 in accordance with the disclosures of my applications hereinbefore referred to. Accordingly, the lower ends of these rods 14 and 15 swing forwardly and rearwardly with the feeder deck 11 as it is moved back and forth in a substantially horizontal plane by the drive means to be hereinafter described. The feeder deck 11 discharges directly upon a continuous conveyor 16 in a manner to also be described hereinafter.

The drive for the reciprocating plate feeder 11 is comprised of a cylinder and piston assembly indicated generally by the numeral 17 and including a cylinder 18 having a head end 19 pivotally supported by the frame of the hopper 8. The rod end 20 of the cylinder is pivotally connected by the rod 21 to the reciprocating feeder deck 11 at a point forward of the point of connection of the head end of the cylinder. This particular arrangement is important for reasons which will be brought out hereinafter.

The cylinder and piston assembly 17 is connected, as shown, to a differential circuit in such a manner as to provide distinct advantages over drives heretofore known. It will be noted that the head end 22 of the piston has an effective pressure transmitting area which is substantially twice that of the rod end 23 of that piston. In other words, the cross sectional area of the piston 24 which surrounds the rod 21 is substantially equal to one-half the area of the head end of the piston. As described in my prior applications, the differential circuit is connected in such a manner that fluid from the rod end 20 is carried back into the head end 19 of the cylinder whenever fluid is directed into the head end by the differential circuit. This causes the forward speed of the cylinder to be substantially increased and the extent of increase depends upon the ratio of the head end area to the rod end annular area of the piston. For example if the ratio is exactly 2 to 1, the forward and rearward speed of the feeder deck will be equal. If the ratio is less than 2 to 1, the forward speed of the feeder deck as viewed in FIG. 1 will be slower than the rearward speed and vice versa. The increased speed is obtained at the expense of working force, because the forward force must overcome pressure in the rod end as well as the work load.

A reversing mechanism 25 is mounted upon the hopper 8 adjacent the upper end of the elongated support rod 14 and is activated by a cam 26 which is mounted upon the rod 14 and swings forwardly and rearwardly therewith. The forward and rearward swinging movement of the rod 14 thereby causes the solenoid valves which are pilot valves to be reversed at each end of the forward and rearward movement and, of course, are capable of adjustment. The solenoid valves have been indicated by the term SOL in each of FIGS. 4–6 inclusive. The solenoid valves are in turn connected with slave hydraulic valves which have been identified by the term HYD in FIGS. 4–6.

Referring to FIG. 4, it will be seen that when solenoid valve 27 is activated, it causes hydraulic valve 28 to be opened with the result that when the motor 29 drives the pump 30, the fluid will flow in the direction of the arrows shown upwardly from the pump and thence to the right through hydraulic valve 28 and thence upwardly to the head end of the cylinder 17. The port 28a of the hydraulic valve 28 is plugged as shown in FIGS. 4 and 5. It will be noted that the rod end 20 of the cylinder is connected directly into the fluid line coming from the pump 30 so that fluid pressure is at all times applied to the rod end 23 of the piston. As the piston moves forwardly within the cylinder 14 the fluid is forced outwardly through the rod end 20 and back into the head end 19 of the cylinder. Thus for each unit volume of hydraulic fluid that is forced into the circuit by the pump 30, two unit volumes will enter the head end of the cylinder 19 and as a result the forward speed of the piston will be increased substantially although less power will be available. Thus it will be readily seen that the forward movement of the reciprocating plate feeder 11 will be relatively more rapid.

When the solenoid valves 27 are moved to the opposite position, the slave hydraulic valve 28 will be moved to the position shown in FIG. 5 so that when the pump 30 pumps fluid, that fluid will move directly upwardly as viewed in FIG. 4 into the rod end 20 of the cylinder while the fluid in the head end 19 of the cylinder will move downwardly and pass as illustrated by the arrows in FIG. 5 through the valve 28 and into the tank or reservoir. These are the positions of the valve when the reversing mechanism 25 reaches one end of its movement and causes the direction of fluid to be reversed and commence the rearward stroke of the feeder 11. Since only one unit volume of fluid will enter the rod end 20 of the cylinder for each unit volume pumped by the pump 30, in contrast to two unit volumes entering the head end during the forward stroke, the rearward stroke of the piston will be relatively slow and the power available will be greater than during the forward stroke of the conveyor.

In FIG. 4 I have indicated diagrammatically the filter 31, the release valve 32, the needle valve 33, and the pressure gauge 34.

FIG. 6 is a schematic wiring diagram showing the start switch 35 tied in with the source of power 36 and the reversing mechanism 25.

It is believed that the advantages of my invention will be readily apparent from the above description. My differential cylinder assembly connected, as shown, to the reciprocating plate feeder 11 in the particular manner shown is ideally suited for the needs of a reciprocating plate feeder as hereinbefore set forth. It will be noted, in this connection, that the plate feeder 11 moves rapidly forward to its forwardmost position and during this forward movement the heavy material slides down through the discharge opening 10 of the hopper upon the rear portions of the plate deck feeder. As the feeder deck 11 is moved relatively slowly rearwardly the heavy material drops off the forward end of the feeder deck for it is, in effect, pushed off the forward end by the presence of the material which slid behind the load of the feeder deck during its forward movement. During this rearward movement the deck moves relatively slowly and uniformly so that a uniform feed is applied to the conveyor 16. When the feeder deck reaches it rearwardmost position the reversing mechanism 25 causes the flow of hydraulic fluid to be reversed as shown in FIGS. 4 and 5 so that the feeder deck again moves forwardly at a relatively rapid speed, thereby tending to overtake the material which has previously been fed upon the conveyor and to again commence to feed at substantially the same place at which the feed was terminated upon the conveyor at the rearwardmost position of the feeder deck. By regulating the speed of the feeder deck and the length of movement thereof, it is possible to acquire a highly improved uniform rate of feed which is extremely important in efficient, economical handling of materials, particularly in situations where large volumes must be handled as is the case in iron ore mining.

It will be noted that when my invention is utilized on a reciprocating plate feeder I have a completely controlled drive at all times which is in sharp contrast, for example, with a mechanical drive. It will also be noted that my reciprocating plate deck feeder constitutes a feeding bottom for the hopper 8. Such an arrangement is entirely impossible if a vibratory feeder were to be utilized. Another advantage which I have through the use of my invention is that full and uniform power is provided throughout all portions of the individual strokes of the drive and it provides a more uniform positive displacement feed rate than has heretofore been known. Additionally, my invention is less susceptible to wear and will function more efficiently than other drives heretofore utilized.

It will, of course, be understood that various changes may be made in the form, details, arrangement and proportions of the parts without departing from the scope of my invention which consists of the matter shown and described herein and set forth in the appended claims.

What is claimed is:

1. In a primary feeder of the withdrawal type for handling and feeding mine-run ore as taken directly from a mine with particles thereof frequently being extremely large and of very heavy weight,
   (a) a stationary hopper for the ore having a lateral discharge opening facing forwardly through which only said ore is to be discharged,
   (b) a rigid reciprocable feeder deck having a substantially flat and horizontal upper material-carrying surface and of a structure to receive thereon and discharge therefrom such mine-run ore mounted in close proximity beneath the discharge opening of said hopper and constituting a movable bottom for said hopper for supporting the weight of such ore in said hopper,
   (c) mounting means engaging said feeder deck in supporting relation only for longitudinal forward and rearward reciprocating movement thereof in a substantially horizontal plane,
   (d) a hydraulic cylinder and piston assembly having one of its ends pivotally connected to said feeder deck and its other end pivotally connected to a fixed support for reciprocating the deck in relatively slow strokes at substantially less than 500 cycles per minute,
   (e) a source of, and means for controlling, hydraulic fluid under pressure operatively connected to said cylinder at each of its ends and alternately driving relatively slowly said piston forwardly and rearwardly in cycles having a frequency of less than 500 per minute to cause said piston to only reciprocate said feeder deck an amount as allowed by said mounting means and controlled amount of hydraulic fluid supplied to the cylinder and cause the latter to carry a load of the ore forwardly from said discharge opening in stationary contact with said feeder deck and to withdraw from beneath the forward portion of the load as said feeder deck is moved rearwardly.

2. The structure defined in claim 1 wherein said mounting means includes a plurality of elongated rods supporting said feeder deck in suspended relation.

3. The structure defined in claim 1 wherein said mounting means includes a plurality of elongated rods one end of each of which is connected to said feeder deck in supporting relation and the other end of each of which are mounted on said hopper.

References Cited in the file of this patent

UNITED STATES PATENTS

| 757,477 | Marcus | Apr. 19, 1904 |
|---|---|---|
| 1,909,166 | Burrell | May 16, 1933 |
| 2,000,805 | West et al. | May 7, 1935 |
| 2,214,755 | Tafel | Sept. 17, 1940 |
| 2,444,134 | Hittson | June 29, 1948 |

FOREIGN PATENTS

| 217,695 | Australia | Feb. 13, 1958 |
|---|---|---|
| 758,028 | France | Oct. 23, 1933 |